US012716569B1

(12) United States Patent
Lamppin et al.

(10) Patent No.: US 12,716,569 B1
(45) Date of Patent: Aug. 25, 2026

(54) LIGHTING INDICATOR ASSEMBLY FOR AN APPLIANCE

(71) Applicant: Haier US Appliance Solutions, Inc., Wilmington, DE (US)

(72) Inventors: Hadassah R. Lamppin, Louisville, KY (US); Zachary Wiles, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/098,240

(22) Filed: Apr. 2, 2025

(51) Int. Cl.

| | |
|---|---|
| ***F21V 5/00*** | (2018.01) |
| ***A47L 15/42*** | (2006.01) |
| *F21W 111/00* | (2006.01) |
| *F21Y 115/10* | (2016.01) |

(52) U.S. Cl.
CPC .......... *F21V 5/007* (2013.01); *A47L 15/4293* (2013.01); *F21W 2111/00* (2013.01); *F21Y 2115/10* (2016.08)

(58) Field of Classification Search
CPC . F21V 5/007; F21W 2111/00; F21Y 2103/10; F21Y 2105/16; G02B 6/0008
See application file for complete search history.

(56) References Cited

U.S. PATENT DOCUMENTS 5,915,060 A 6/1999 Kerskey et al.
6,867,704 B2 * 3/2005 Pellegrino ............ G06F 11/324 362/555
8,003,923 B2 * 8/2011 Wilsdorf ............... F24C 15/024 219/508
8,810,423 B2 * 8/2014 Kaczmarek ......... A47L 15/4257 700/17
9,179,554 B2 11/2015 Schuh
10,859,253 B2 12/2020 Benton et al.
11,185,212 B2 * 11/2021 Ford, Jr. ............. A47L 15/4293
11,278,179 B2 3/2022 Brewer et al.
11,648,871 B1 * 5/2023 Lan ...................... B60Q 1/2607 340/458

(Continued)

FOREIGN PATENT DOCUMENTS

EP 2455930 B1 9/2013
EP 4096097 A1 11/2022

OTHER PUBLICATIONS

Alibaba, "Plastic Light Pipe 2 Array Type LED Right-angle Light Guide 90 Degree Light Guide Pipe LPE2", Dongguan Aiwei Electronic Technology Co., Ltd., Alibaba.com, 2025, Retrieved from internet: https://www.alibaba.com/product-detail/Plastic-Light-Pipe-2-Array-Type_1600655631223.html?spm=a2700 details_you_may_like.3.580e2ab4pHSU9d.

*Primary Examiner* — Tracie Y Green
*Assistant Examiner* — Michael Chiang
(74) *Attorney, Agent, or Firm* — Dority & Manning, P.A.

(57) ABSTRACT

A lighting assembly is for an appliance. The lighting assembly includes a plurality of light sources that selectively emit a light energy. The lighting assembly includes a plurality of indicator lenses respectively interfaced with the plurality of light sources. Each indicator lens of the plurality of indicator lenses are spaced from adjacent indicator lenses. The lighting assembly includes a bar coupled with the plurality of indicator lenses. The lighting assembly includes an outer panel that defines an indicator aperture. Light energy directed through the bar emits through the indicator aperture.

20 Claims, 5 Drawing Sheets

(56) References Cited

U.S. PATENT DOCUMENTS

| | | | | |
|---|---|---|---|---|
| 2019/0154228 | A1* | 5/2019 | Xiang | F21S 41/192 |
| 2020/0198530 | A1* | 6/2020 | Hellin_Navarro | F21S 43/15 |
| 2020/0337522 | A1* | 10/2020 | Brewer | A47L 15/4265 |
| 2020/0340631 | A1* | 10/2020 | Mertens | F21K 9/69 |
| 2021/0146841 | A1* | 5/2021 | Huizen | F21S 43/15 |
| 2024/0359620 | A1* | 10/2024 | Tassy | G02B 6/0038 |
| 2024/0426451 | A1* | 12/2024 | Eckstein | F21S 43/239 |

* cited by examiner

LIGHTING INDICATOR ASSEMBLY FOR AN APPLIANCE

FIELD OF THE INVENTION

The present subject matter relates generally to lighting indicator assemblies for appliances, and more particularly to lighting assemblies and status indicators illuminating animations.

BACKGROUND OF THE INVENTION

Appliances frequently include a user interface panel or the like. In order to provide a user with information regarding the appliance operation, e.g., such as a status of an operating cycle or an indication that a cycle is complete, status indicators are often positioned on the front or top surface of the appliance such that they are visible to a user of the appliance.

The status indicators are often light diffusers or light pipes that simply diffuse or transmit light generated by a separate light source. Such light sources are commonly mounted on a light board or a control panel as part of a discrete attachment or assembly mounted to the appliance door, e.g., to reduce wiring complexity of such light sources and to simplify the assembly of the door. However, conventional lighting assemblies and features for transmitting light may suffer from a lack of brightness, intensity, uniformity, and versatility of illumination.

Accordingly, an appliance having features for simplified assembly and improved illumination of status indicators would be useful. More specifically, a lighting assembly for an appliance having improved visual indicators, simplified assembly, and minimal space requirements would be particularly beneficial.

BRIEF DESCRIPTION OF THE INVENTION

Aspects and advantages of the invention will be set forth in part in the following description, or may be obvious from the description, or may be learned through practice of the invention.

In one example aspect of the present disclosure, an appliance defines a transverse direction, a lateral direction, and a vertical direction. The appliance includes an outer panel that defines an indicator aperture. The appliance includes a lighting assembly positioned transversely behind the outer panel. The lighting assembly includes a first light source that selectively emits a first portion of a light energy and a second light source that selectively emits a second portion of the light energy. The lighting assembly includes a first indicator lens that extends between the outer panel and the first light source. The lighting assembly includes a bar coupled with the first indicator lens and a second indicator lens spaced laterally from the first indicator lens. The second indicator lens is coupled with the bar.

In another example aspect of the present disclosure, a lighting assembly is for an appliance that has an outer panel that defines an indicator aperture. The lighting assembly includes a plurality of light sources that selectively emits a light energy. The lighting assembly includes a plurality of indicator lenses respectively interfaced with the plurality of light sources. Each indicator lens of the plurality of indicator lenses are spaced from adjacent indicator lenses. The lighting assembly includes a bar coupled with the plurality of indicator lenses. Light energy directed through the bar emits through the indicator aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
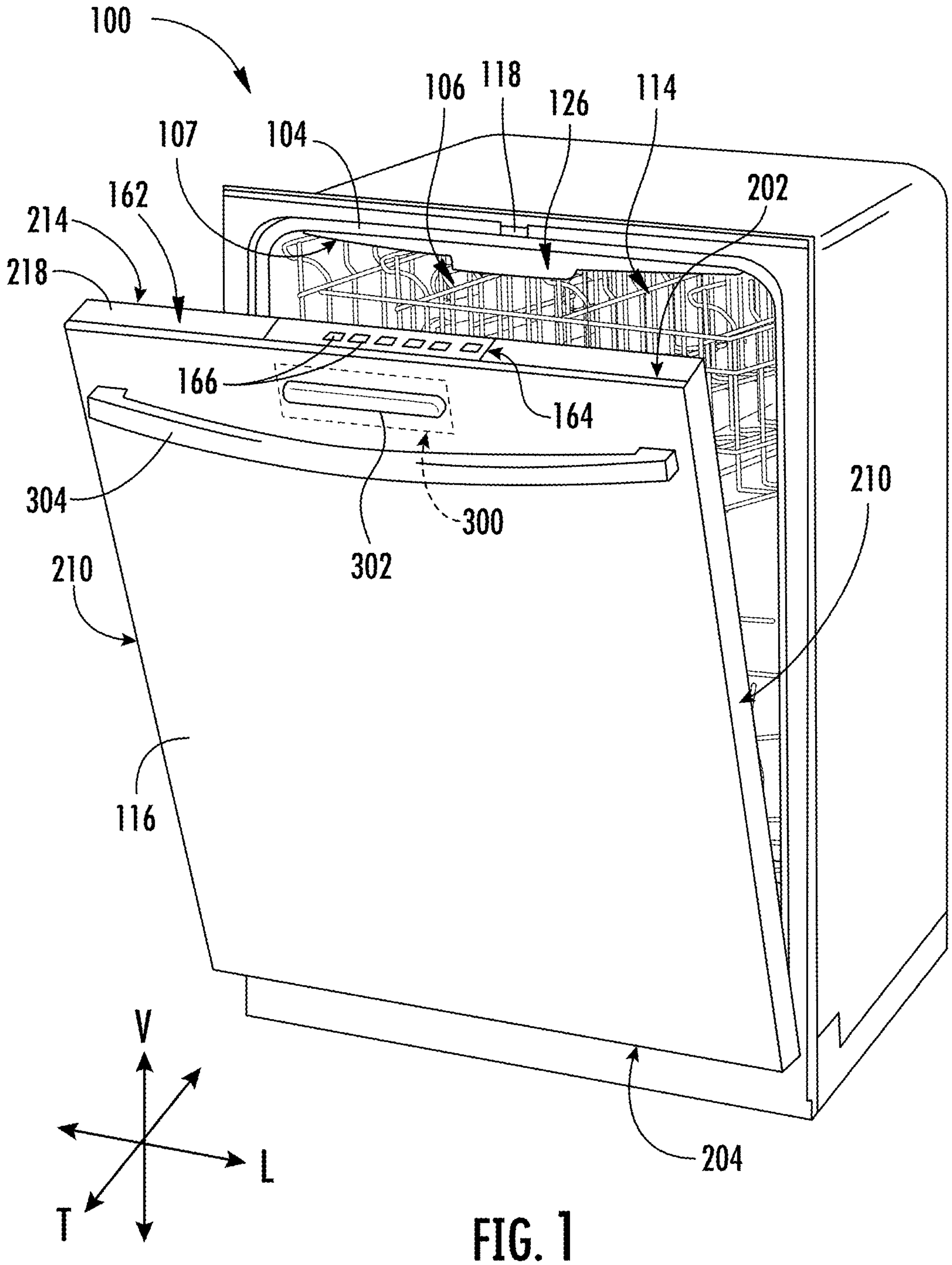
FIG. 1 provides a perspective view of a dishwasher appliance, including a dishwasher door according to example embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the term "or" is generally intended to be inclusive (i.e., "A or B" is intended to mean "A or B or both"). Furthermore, as used herein, terms of approximation, such as "approximately," "substantially," or "about," refer to being within a ten percent margin of error.

Figure 2:
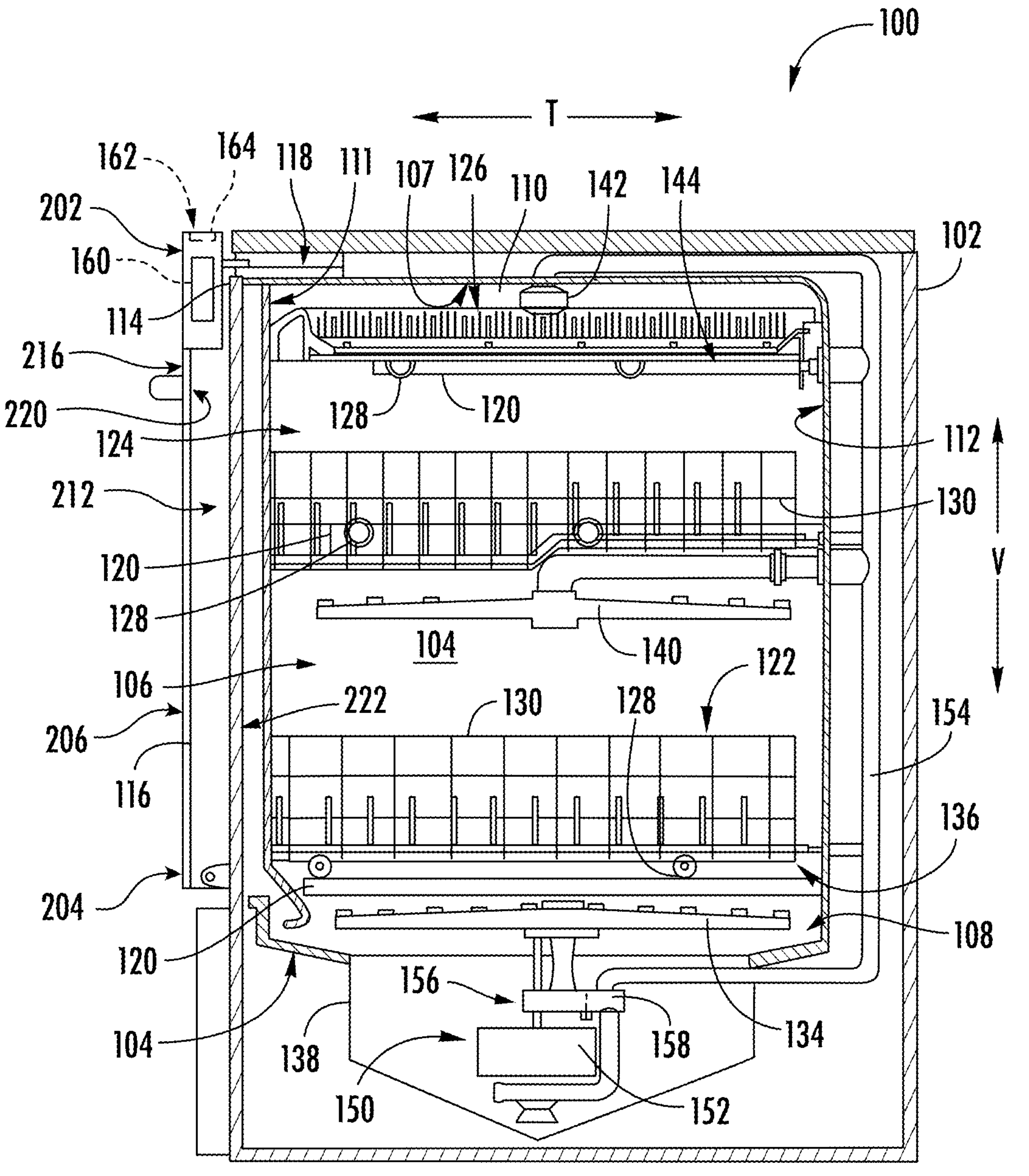
FIG. 2 provides a cross-sectional side view of the example dishwashing appliance of FIG. 1.

FIGS. 1 and 2 depict an example domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to example embodiments, dishwasher 100 further includes a door closure mechanism or assembly 118 that is used to lock and unlock door 116 for accessing and sealing wash chamber 106.

As illustrated in FIG. 2, tub side walls 110 may accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another example embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies (e.g., to mid-level spray arm assembly 140 and upper spray assembly 142). However, it should be appreciated that according to alternative embodiments, any other suitable plumbing configuration may be used to supply wash fluid throughout the various spray manifolds and assemblies described herein. For example, according to another example embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156 (e.g., which may be positioned within sump 138 of dishwasher appliance 100). Diverter assembly 156 may include a diverter disk (not shown) disposed within a diverter chamber 158 for selectively distributing the wash fluid to the spray arm assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an example embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154).

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses.

It should be appreciated that the invention is not limited to any particular style, model, or configuration of dishwasher 100. The example embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter. Moreover, aspects of the present subject matter may be applied to other appliances as well, such as refrigerators, ovens, microwaves, etc.

Figure 3:
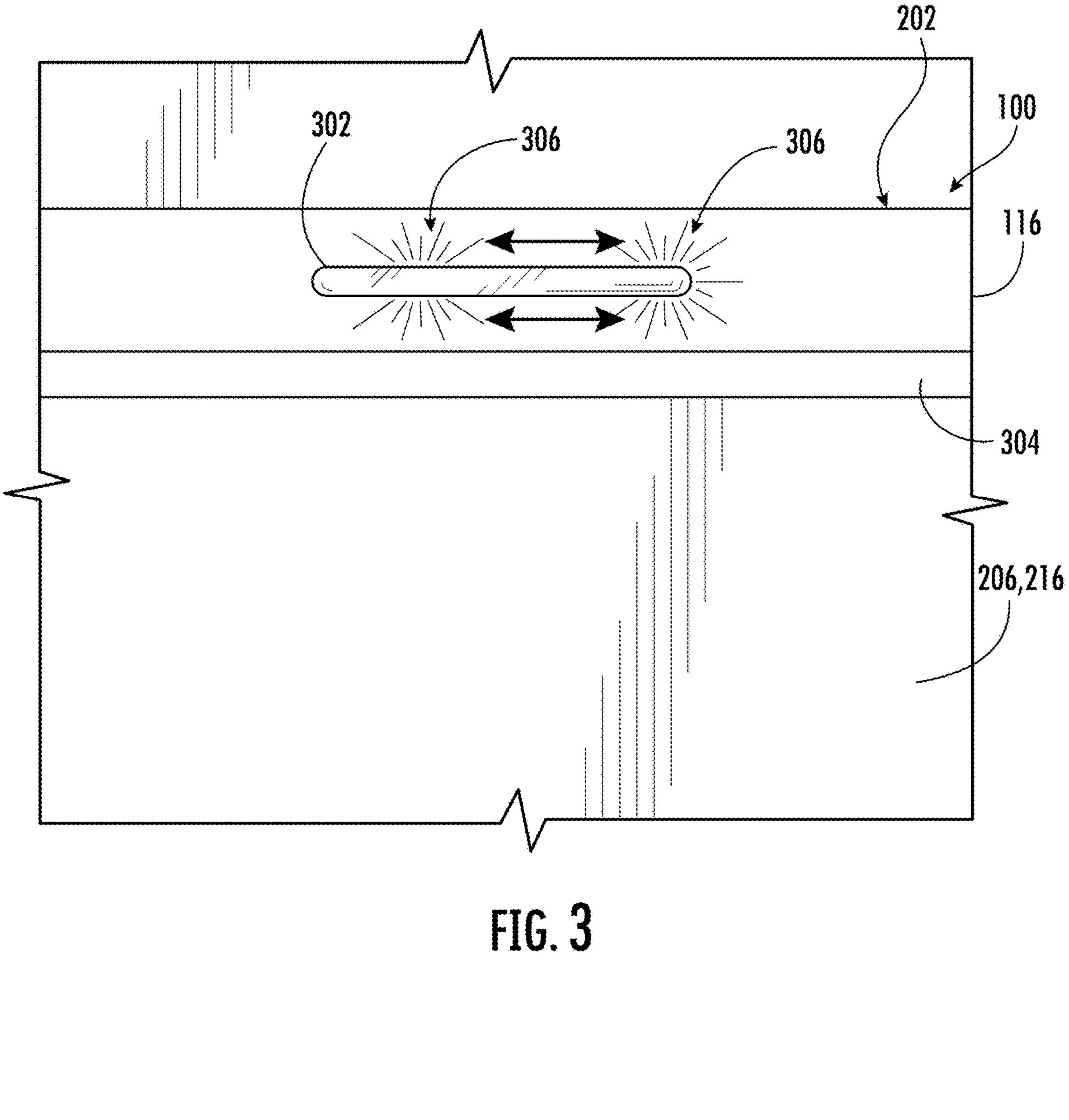
FIG. 3 provides a front view of a top portion of a dishwasher door, including a visual indicator, according to example embodiments of the present disclosure.
Figure 4:
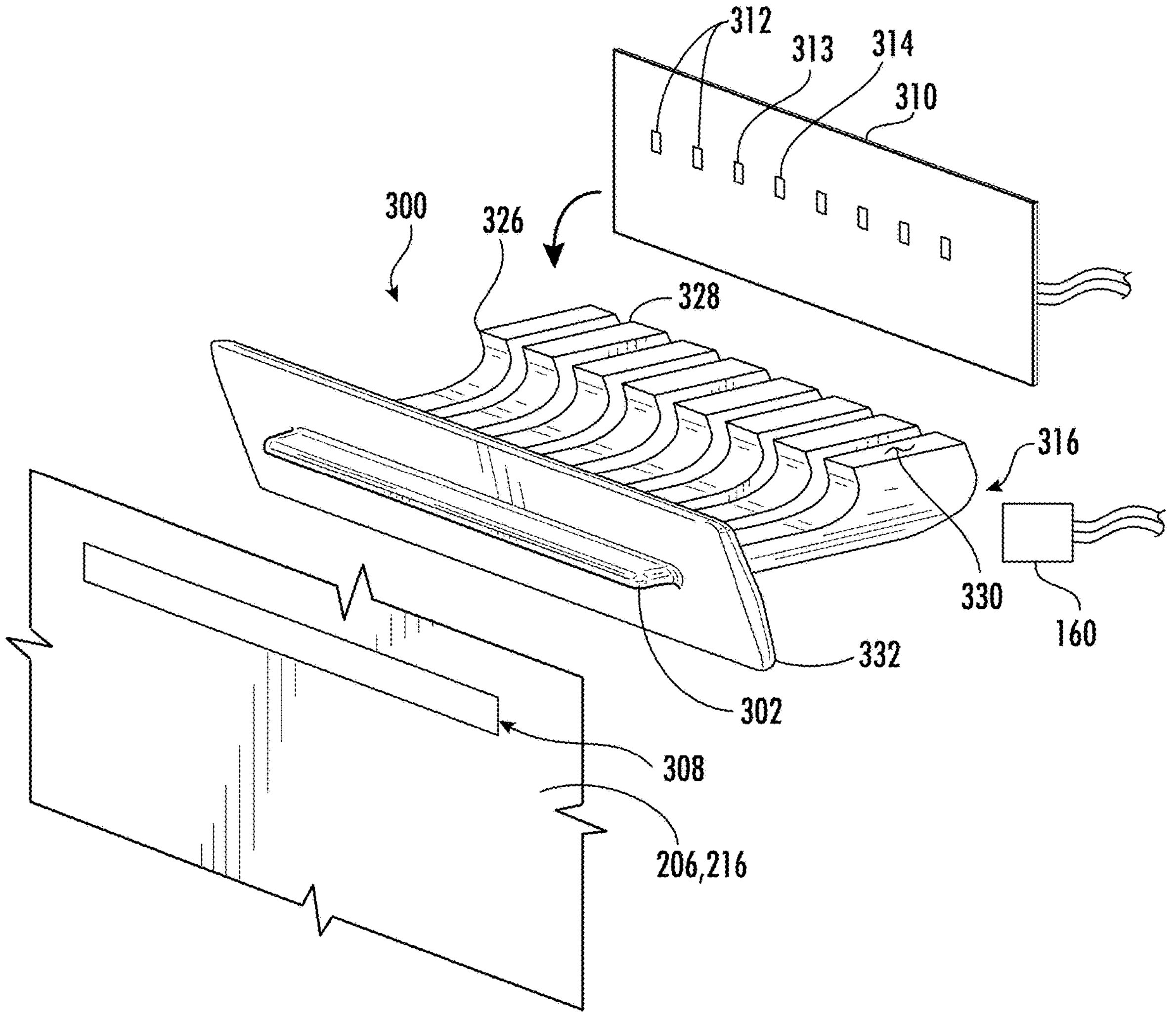
FIG. 4 provides an exploded view of a lighting assembly of the example dishwashing appliance of FIG. 1.

Referring now generally to FIGS. 3 and 4, a lighting assembly 300 for the appliance 100 will be described according to example embodiments of the present subject matter. For example, lighting assembly 300 may be used, or assembled with, the door 116 of dishwashing appliance 100. Alternatively, the lighting assembly 300 may be used on any other suitable residential or commercial appliance at various locations of the appliance that are viewable by a user. As described herein, the lighting assembly 300 may share a coordinate system with dishwashing appliance 100, e.g., when the lighting assembly 300 that is coupled with the door 116 in the closed position (e.g., as shown in FIG. 2). Specifically, lighting assembly 300 may define a vertical direction V, a lateral direction L, and a transverse direction T. Therefore, these directions will also be used herein to refer to features of the lighting assembly 300 and its various components and sub-assemblies. Referring briefly again to FIGS. 1 and 2, in the normally closed position, the door 116 extends from a top end 202 to a bottom end 204 along the vertical direction V; from a front end 206 to a rear end 208 along the transverse direction T; and between two lateral ends 210 along the lateral direction L.

As best illustrated in FIG. 3, the door 116 may include one or more exterior panels formed about and defining an interior chamber 212 of the door 116. For example, the door 116 generally includes an inner panel 214 and an outer panel 216 which are spaced apart from each other along the transverse direction T to define a gap or interior chamber 212 of the door 116 therebetween. Additionally, or alternatively, the outer panel 216 may be the most transverse frontward panel that may be coupled with the appliance 100 directly. For instance, outer panel 216 may be positioned at or proximal to the front end 206 (i.e., distal to the rear end 208) and inner panel 214 may be positioned at or proximal to the rear end 20 (i.e., distal to the front end 206). Additionally, or alternatively, the outer panel 216 may define an inner surface 220 that faces the interior chamber 212 opposite the front end 206. Additionally, or alternatively, the lighting assembly 300 may be coupled with the outer panel 216 at the inner surface 220 via any suitable means including, for example, a friction fit, adhesives, fasteners, or the like.

According to example embodiments, inner panel 214 and outer panel 216 may be panels that are stamped from stainless steel. Alternatively, inner panel 214 and outer panel 216 may be formed from any other suitably rigid material, such as thermoformed plastic, other metals, etc. In general, inner panel 214 and outer panel 216 may be assembled in any suitable manner. In addition, inner panel 214 and outer panel 216 may be secured together using any suitable mechanical fastener, welding, snap-fit mechanisms, etc. In addition, it should be appreciated that an insulating material (not shown), such as fiberglass or foam insulation, may be positioned within interior chamber 212 to provide thermal and/or sound insulation to dishwashing appliance 100.

A top panel 218 may be positioned on or otherwise attached to inner panel 214 and outer panel 216 at the top end 202 of the door 116. For instance, top panel 218 may extend rearward from outer panel 216 along the transverse direction T toward inner panel 214. In certain embodiments, top panel 218 is positioned perpendicular (i.e., at substantially 90° relative to) outer panel 216. As should be understood, in some embodiments, outer panel 216 covers substantially the entire door along the vertical direction V and generally extends from the top end 202 to the bottom end 204 (see, e.g., FIGS. 1 and 2). In additional or alternative embodiments, top panel 218 covers substantially all of the door 116 along the transverse direction T and generally extends from the front end 206 to the rear end 208 (see, e.g., FIG. 2). One or both of outer panel 216 or top panel 218 may extend between lateral ends 210 of the door 116 along the lateral direction L. In some embodiments, one or more user inputs 166 (e.g., buttons) of user interface 164 may be positioned at a top end 202 of the door 116.

Figure 5:
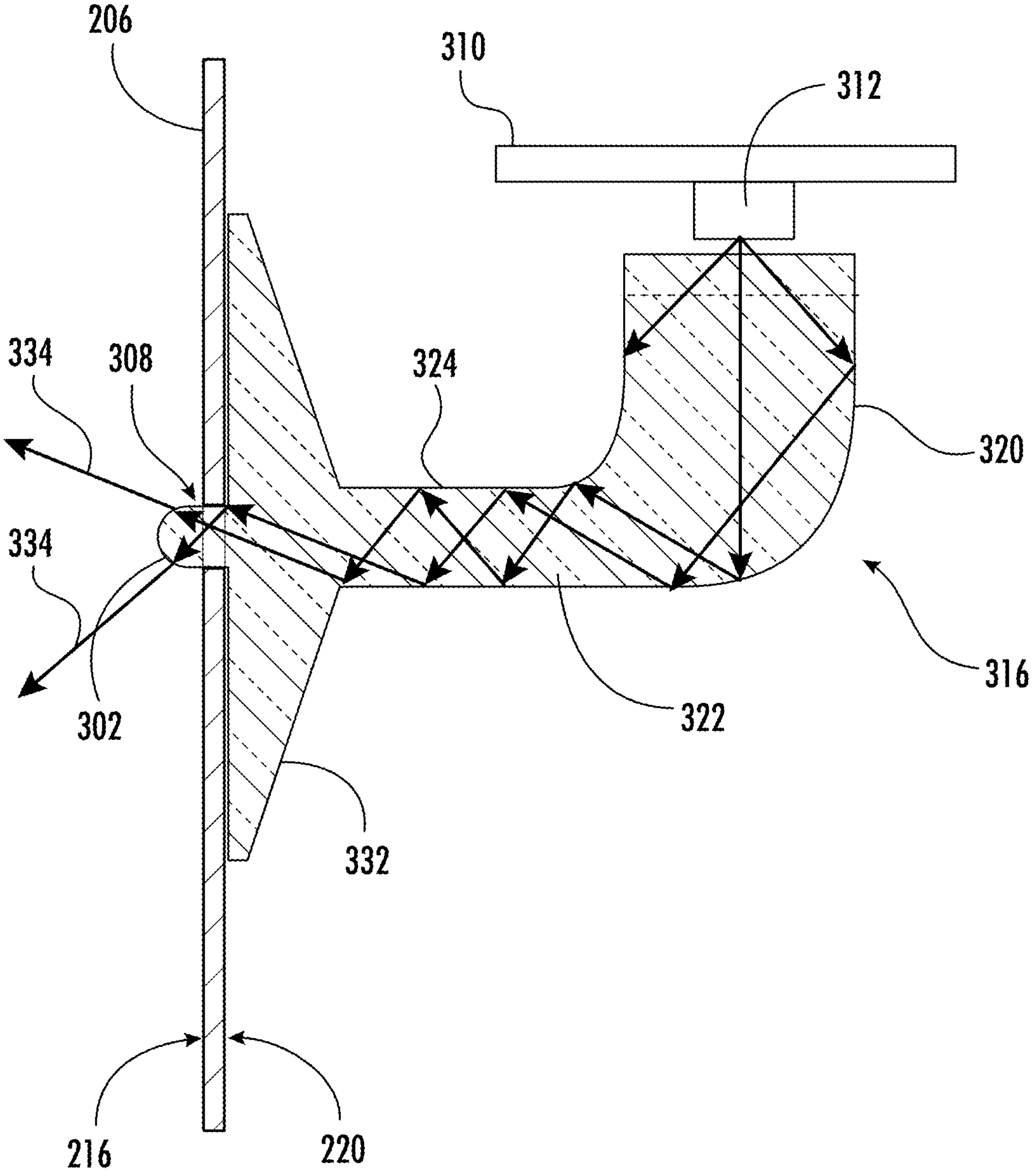
FIG. 5 provides a cross-sectional view of the lighting assembly of the example dishwashing appliance of FIG. 1.

With reference to FIGS. 3 through 5, the lighting assembly 300 may include features for illuminating one or more status indicators (e.g., indicated in FIG. 1 as bar 302). More specifically, according to an example embodiment, the lighting assembly provides features for facilitating effective lighting of such status indicators using at least one light source 312, e.g., such as a white or colored light emitting diode (LED), while still providing colored light indication, as described below. In addition, such light sources 312 within the lighting assembly 300 are positioned at locations that simplify door assembly, improve indicator illumination, and reduce the space requirements commonly required for such lighting assemblies in conventional appliance doors.

Specifically, according to an example embodiment, a plurality of light sources 312 is positioned within interior chamber 212 to provide light (e.g., light emissions or light energy as described below) to illuminate at least one indicator lens 324, and ultimately the bar 302 that may be visible to a user outside of interior chamber 212. The bar 302 may be at least semi-transparent such that light pass through the bar 302. As should be understood, the number of light sources 312 and indicator lens 324 illustrated herein are only used for explaining aspects of the present subject matter and are not intended to limit the scope of the disclosure. According to alternative embodiments, any suitable number, position, and configuration of light sources 312 and indicator lenses 324 may be used to illuminate status indicators in any suitable colors, sizes, patterns, etc. Thus, although FIGS. 3 and 4 illustrate a plurality of light sources 312 and a corresponding indicator lens 324 for illuminating a single display indicator 302, or bar, it is understood that example embodiments may include multiple similar light sources and indicator lenses, each corresponding to one or more unique display components. Additionally, or alternatively, the plurality of light sources 312 may include at least a first light source 313 and a second light source 314. Further, the plurality of indicator lenses 324 may include at least a first indicator lens 326 and a second indicator lens 328.

As shown in FIGS. 3 and 4, light sources 312 may be mounted to control board 310, or printed circuit board (PCB). Additionally, or alternatively, light sources 312 may be mounted behind or rearward transversely from the outer panel 216. Light sources 312 may be provided as any suitable number, type, position, and configuration of electrical light source(s), using any suitable light technology and illuminating in any suitable color. For example, according to the illustrated embodiment, the light sources 312 includes one or more light emitting diodes (LEDs), which may each illuminate in a single color (e.g., white LEDs, or single color light emitting diodes), or which may each illuminate in multiple colors (e.g., multi-color or RGB LEDs) depending on the control signal from controller 160.

However, it should be appreciated that according to alternative embodiments, light sources 312 may include any other suitable traditional light bulbs or sources, such as halogen bulbs, fluorescent bulbs, incandescent bulbs, glow bars, a fiber light source, etc. Moreover, light sources 312 may be operably coupled (e.g., electrically coupled) to control board 310 or controller 160 (FIG. 2). Activation or illumination of light sources 312 may be generally controlled by control board 310 or controller 160 (e.g., to indicate a user input, state of the dishwasher appliance, state of the wash cycle, or any other relevant information to a user).

Referring now specifically to FIGS. 4 and 5, the particular configuration of the plurality of lighting assembly 300 will be described according to an example embodiment of the present subject matter. Specifically, as shown, the plurality of light sources 312 includes the first light source 313 and a second light source 314 positioned adjacent each other along the lateral direction L. In addition, first light source 313 and second light source 314 are illustrated as being mounted on the control board 310 (e.g. which may house controller 160). In general, first light source 313 may be selectively operated to emit a first portion of light energy 306 and second light source 314 may be selectively operated to emit a second portion of light energy 306. In some embodiments, light sources 313, 314 are directed substantially downward along the vertical direction V. Thus, when activated to illuminate indicator lens 324 (e.g., the first indicator lens 326 and the second indicator lens 328), light sources 313, 314 may project light emissions along the vertical direction V and generally toward the bottom end 204 (FIG. 2), opposite top panel 218. Additionally, or alternatively, each indicator lens (e.g., the first indicator lens 326) may include a first extension 320 that is elongate in the vertical direction V along a major direction of extent. The first extension 320 may have a receiving surface 330 that interfaces with the light sources 312 (e.g., the first light source 313). Additionally, or alternatively, each light source of the plurality of light sources 312 may directly engage, or contact, each indicator lens of the plurality of indicator lenses 324, respectively.

Generally, indicator lenses 324 may be any suitable transparent or semitransparent feature for diffusing, directing, or otherwise transmitting light from a light source, such as first light source 313 and second light source 314. For example, indicator lenses 324 may be formed from a suitable transparent or translucent material configured to direct light energy 306 therethrough. For example, indicator lenses 324 may be constructed from glass, polycarbonate, polypropylene, polyacrylic, or any other suitable material.

In particular, at least a portion (e.g., the first extension 320) of indicator lens 324 is positioned below light sources 312. Indicator lenses 324 itself may extend from the receiving surface 330 of the first extension 320 to a curved portion 316 that is connected with a second extension 322 that is coupled with the bar 302. The second extension 322 is nonparallel (e.g., perpendicular or set in another suitable angle between 0° and 180°) relative to the first extension 320. A projection path 334 for the light energy 306 may be defined through indicator lenses 324 from the receiving surface 330 to the bar 302. Thus, at least a portion of the light emissions received at the receiving surface 330 may be directed to the bar 302 and then, for example, to a user facing the outer panel 216 of the appliance 100.

According to the illustrated embodiment, due to the receiving surface 330 and the bar 302 being nonparallel, the projection path 334 may define the curved portion 316 through which indicator lenses 324 must turn or reflect the light energy 306. According to the illustrated embodiment, the curved portion 316 redirects the light energy 306 approximately 90 degrees. However, it should be appreciated that according to alternative embodiments, the curved portion 316 may direct the light energy 306 along any other suitable angle, such as between about 0° and 180°, between about 60° and 120°, between about 80° and 100°, etc. Additionally, or alternatively, the curved portion 316 may be referred to as a radius, for example.

With continued reference to FIG. 5, the indicator lenses 324 may each narrow along the projection path 334. For example, the first extension 320 may have a first cross-sectional area in a transverse-lateral plane (e.g., at the receiving surface 330) that is greater a second cross-sectional area in a vertical-lateral plane of the second extension 322 (e.g., at the bar 302). This narrowing the respective cross-sections may allows for the light energy 306 to be more focused and concentrated before reaching the bar 302, for example.

With continued reference to FIGS. 4 and 5, the lighting assembly 300 may include a bracket 332 coupled with the second extension 322 and the bar 302. Additionally, or alternatively, the bracket 332 may extend transversely between the second extension 322 and the bar 302, as illustrated in the examples of the figures. Further, the bracket 332 may extend laterally and vertically beyond the bar 302. The bracket 332 may interface with the outer panel 216 at the inner surface 220, as shown in the example of FIG. 5. The bracket 332 may be a lens (e.g., made from a material that allows light energy to pass through). Additionally, or alternatively, the plurality of indicator lenses 324, the bracket 332, and the bar 302 may be integrally formed from a single, unitary piece.

Furthermore, each indicator lens of the plurality of indicator lenses 324 are spaced apart from adjacent indicator lenses by air gaps. Thus, there is more discretization between the first portion of the light energy 306, the second portion of the light energy 306, and so on. Additionally, or alternatively, the light energy 306 is comparatively diffused once the light energy 306 reaches the bar 302. The plurality of indicator lenses 324 being discrete from each other yet joined at the bar 302 allows the lighting assembly 300 to generate clearer and more picturesque animations.

The controller 160 may selectively activate one light source (e.g., the first light source 313) of the plurality of light sources 312 then sequentially activate a different and adjacent light source (e.g., the second light source 314) of the plurality of light sources 312. Additionally, or alternatively, the controller 160 may oscillatingly activate each light source of the plurality of light sources 312 from a first-most-lateral light source of the plurality of light sources 312 to a last-most-lateral light source of the plurality of light sources 312 and back again repeatedly. This animation may be referred to as a "Knight Rider" effect. However, it is to be understood that the animations generated by the controller 160 and the lighting assembly 300, including the plurality of light sources 312, is not limited to the Knight Rider animation, but may further include blinking animations, pointing animations (e.g., repeatedly emitting the light energy 302 sequentially in one direction among a first-most-lateral light source to a last-most-lateral light source, or vice versa), and more. The bar 302 diffusing the light energy 306 allows the light energy 306 to appear to be moving (e.g., left to right) continuously rather than being emitted from discrete sources (e.g., the first light source 313 and the second light source 314). Furthermore, animations generated by the lighting assembly 300 may be uniformly or homogeneously colored (e.g., white light). Additionally, or alternatively, animations generated by the lighting assembly 300 may be heterogeneously color and nonuniform (e.g., rainbow, RGB, etc.)

An indicator aperture 308 is defined through the outer panel 216. As shown, indicator aperture 308 may extend along the transverse direction T to permit light energy 306 therethrough (e.g., light energy may pass from transversely behind the outer panel 216 to transversely in front of the outer panel 216). For instance, indicator aperture 308 may be defined as a void extending fully through outer panel 216 (e.g., completely through outer panel 216 along the transverse direction T). In some such embodiments, the bar 302 is received through indicator aperture 308. In other words, the bar 302 may protrude through the indicator aperture 308. In alternative embodiments, however, indicator aperture 308 is defined as a nonpermeable (e.g., to water) segment of outer panel 216 through which light energy 306 may pass. As an example, indicator aperture 308 may be a transparent or translucent portion of outer panel 216 that generally permits at least a portion of visible light therethrough (e.g., from interior chamber 212 to the ambient environment surrounding the appliance).

When light sources 312 are activated or illuminated, light energy 306 from light sources 312 may thus be directed along projection path 334 from the receiving surface 330 to the bar 302 and through indicator aperture 308. Advantageously, the relative position of light sources 312 (e.g., the first and second light sources 313, 314), indicator lenses 324, and indicator aperture 308 may permit a significant amount light to be directed through interior chamber 212 along the projection path 334 and reduce the overall transverse depth that may be required for interior chamber 212. Moreover, the described embodiments may permit light sources 312 to be mounted on control board 310, further reducing complexity and space requirements within the appliance.

Referring again to FIG. 5, indicator lenses 324 may include features or materials that adjust the color or tint of the light passing therethrough. For example, indicator lenses 324 may include a tinted film (not shown), material, or screen positioned on the receiving surface 330 for coloring the light energy 306 that passes through the first extension 320, the curved portion 316, and the second extension 322 of the indicator lenses 324. Additionally, or alternatively, the receiving surface 330 may remain clear, or free of tints, screens, etc. for permitting clear or white LED light to pass therethrough. Additionally, or alternatively, each indicator lens of the plurality of indicator lenses 324 may have such features to change the color and/or tint of each portion of the light energy 306 emitted therethrough, respectively. Notably, when the lighting assembly 300 is set up in this manner, control board 310 (e.g., or controller 160) may illuminate first light source 313 to provide a colored light (e.g., red, blue, etc.) after passing through the first indicator lens 326 and may illuminate second light source 314 to allow the second indicator lens 328 to provide another light (e.g., white or a different color from the first light source 313).

With even further reference to FIGS. 4 and 5, the lighting assembly 300 may be arranged such that each light source of the plurality of light sources 312 are directly coupled, or engaged, with the plurality of indicator lenses 324, respectively. More specifically, the light sources 312 may directly interface the receiving surface 330. Thus, the arrangement of the light sources 312 and the receiving surface 330 may minimize how much the light energy 306 pours over to adjacent indicator lenses of the plurality of indicator lenses 324 before the light energy reaches the bar 302.

Advantageously, the lighting assembly 300 described herein allows for an appliance to display an animation that may include such animations as the Knight Rider effect animation by utilizing discrete indicator lenses and a bar that diffuses light energy from the discrete indicator lenses. This may allow users of the appliance to set up animations that are elegant, paced, colored, and generally styled based on preferences of the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining a transverse direction, a lateral direction, and a vertical direction, the appliance comprising:
- an outer panel defining an indicator aperture; and
- a lighting assembly positioned transversely behind the outer panel, the lighting assembly comprising:
  - a first light source selectively emitting a first portion of a light energy;
  - a second light source selectively emitting a second portion of the light energy;
  - a first indicator lens extending between the outer panel and the first light source;
  - a bar coupled with the first indicator lens; and
  - a second indicator lens spaced laterally from the first indicator lens by an air gap at the bar, wherein the second indicator lens is coupled with the bar.

2. The appliance of claim 1, further comprising a controller, wherein the controller is configured to selectively activate at least one of the first light source and the second light source to generate a first animation at the bar.

3. The appliance of claim 2, wherein the first light source and the second light source are part of an array of light sources, wherein the first animation comprises sequentially and oscillatingly activating the first light source and the second light source of the array of light sources.

4. The appliance of claim 1, wherein each of the first indicator lens and the second indicator lens includes:
- a first extension having a receiving surface, wherein the receiving surface is configured to receive the light energy, wherein the first extension of each indicator lens is spaced from an adjacent indicator lens;
- a curved portion coupled with the first extension, wherein the curved portion redirects the light energy from the first extension, wherein the curved portion of each indicator lens is spaced from an adjacent indicator lens; and
- a second extension coupled with the curved portion, wherein the second extension directs the light energy to the bar, wherein the second extension of each indicator lens is spaced from an adjacent indicator lens by the air gap.

5. The appliance of claim 4, wherein the lighting assembly further comprises a bracket coupled with the first indicator lens, the second indicator lens, the bar, and the outer panel.

6. The appliance of claim 5, wherein the first indicator lens, the second indicator lens, the bracket, and the bar are formed as a single, integral, and unitary piece.

7. The appliance of claim 4, wherein the bracket extends laterally between the second extension of the first indicator lens and the second extension of the second indicator lens.

8. The appliance of claim 1, wherein the second light source directly engages the second indicator lens.

9. The appliance of claim 1, wherein the first indicator lens and the second indicator lens funnel the first portion of light energy and the second portion of light energy, respectively.

10. The appliance of claim 1, wherein the first light source and the second light source are single color light emitting diodes (LEDs).

11. A lighting assembly for an appliance having an outer panel defining an indicator aperture, the lighting assembly comprising:
- a plurality of light sources selectively emitting a light energy;
- a plurality of indicator lenses respectively interfaced with the plurality of light sources, wherein each indicator lens of the plurality of indicator lenses are spaced from adjacent indicator lenses by an air gap;
- a bar coupled with the plurality of indicator lenses; and
- wherein light energy directed through the bar emits through the indicator aperture.

12. The lighting assembly of claim 11, further comprising a controller, wherein the controller is configured to selectively activate at least one light source of the plurality of light sources to generate a first animation at the bar.

13. The lighting assembly of claim 12, wherein the first animation includes sequentially and oscillatingly activating each light source of the plurality of light sources.

14. The lighting assembly of claim 11, wherein each indicator lens of the plurality of indicator lenses includes:
- a first extension having a receiving surface, wherein the plurality of light sources directs the light energy onto the receiving surface, respectively;
- a curved portion coupled with the first extension, wherein the curved portion redirects the light energy from the first extension; and
- a second extension coupled with the curved portion, wherein the second extension directs the light energy from the curved portion to the bar.

15. The lighting assembly of claim 14, wherein the plurality of light sources directly engage the receiving surface of the first extension of the plurality of indicator lenses, respectively.

16. The lighting assembly of claim 11, further comprising:
- a bracket coupled with the plurality of indicator lenses and the bar.

17. The lighting assembly of claim 16, wherein the plurality of indicator lenses, the bracket, and the bar are formed as a single, integral, and unitary piece.

18. The lighting assembly of claim 11, wherein the plurality of indicator lenses funnels the light energy.

19. The lighting assembly of claim 11, wherein the bar protrudes through the indicator aperture of the outer panel.

20. A lighting assembly for an appliance having an outer panel defining an indicator aperture, the lighting assembly comprising:
- a plurality of light sources selectively emitting a light energy;
- a plurality of indicator lenses respectively interfaced with the plurality of light sources, wherein each indicator lens of the plurality of indicator lenses are spaced from adjacent indicator lenses by an air gap, wherein each indicator lens of the plurality of indicator lenses includes:
  - a first extension having a receiving surface, wherein the plurality of light sources directs the light energy onto the receiving surface, respectively;
  - a curved portion coupled with the first extension, wherein the curved portion redirects the light energy from the first extension; and
  - a second extension coupled with the curved portion, wherein the second extension directs the light energy from the curved portion;
- a bracket coupled with the second extension of each indicator lens of the plurality of indicator lenses and forming a close fit with the outer panel, wherein the bracket extends laterally between adjacent second extensions of each indicator lens, wherein the bracket slopes away from the plurality of indicator lenses collectively starting at the second extension, and wherein the bracket directs light from the second extension of each indicator lens.

* * * * *